June 26, 1962 A. G. TALBERT 3,041,087
REMOVABLE GOOSENECK DRAWBAR FOR TRAILERS AND THE LIKE
Filed Feb. 12, 1959 3 Sheets-Sheet 1
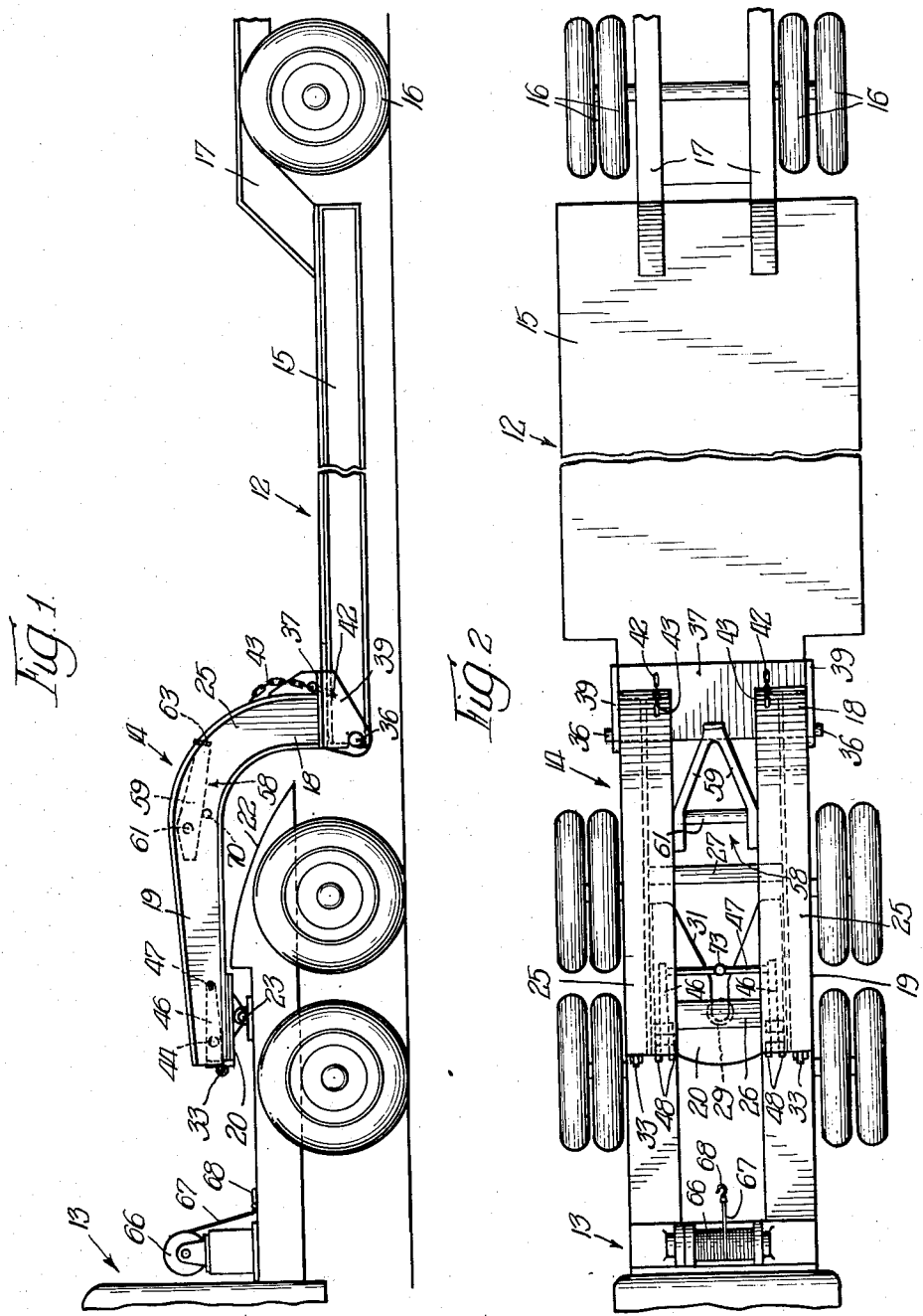
INVENTOR.
Austin G. Talbert,
BY
Cromwell, Greist & Warden
Attys.

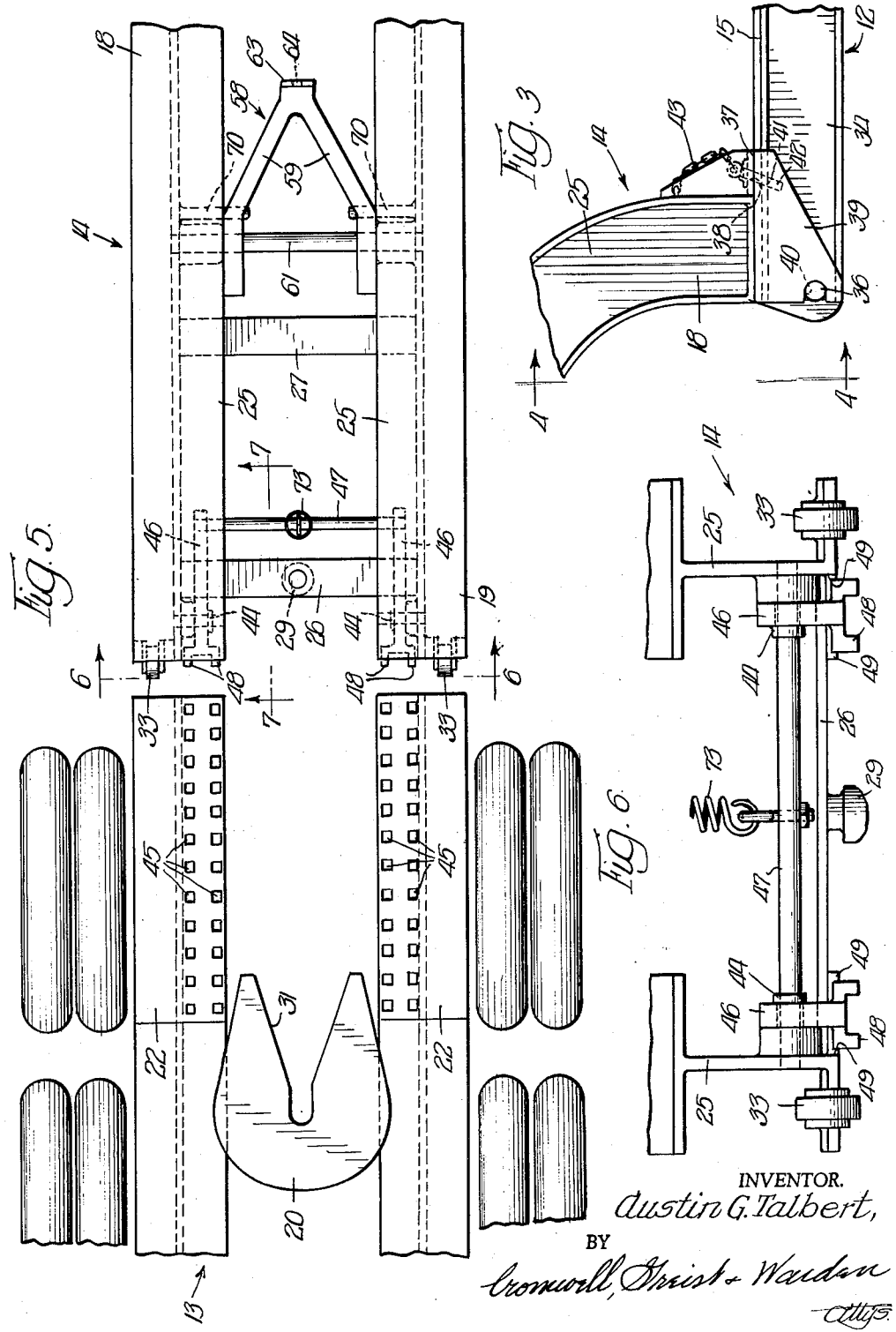

June 26, 1962  A. G. TALBERT  3,041,087
REMOVABLE GOOSENECK DRAWBAR FOR TRAILERS AND THE LIKE
Filed Feb. 12, 1959  3 Sheets-Sheet 3
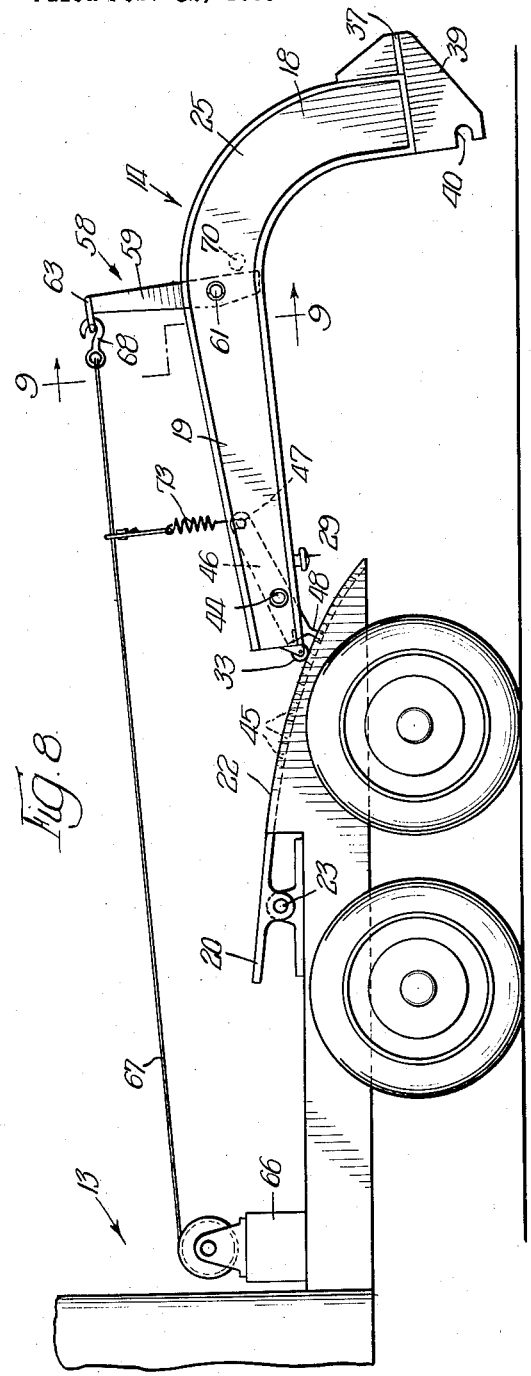
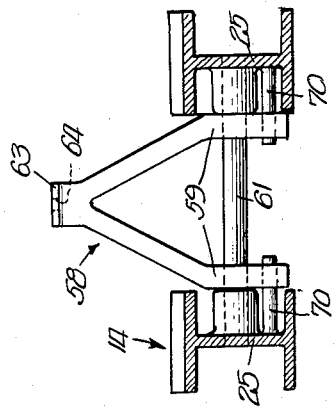
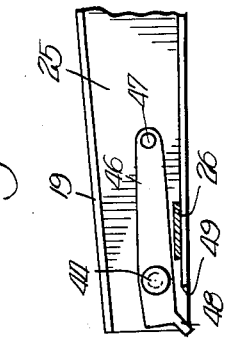
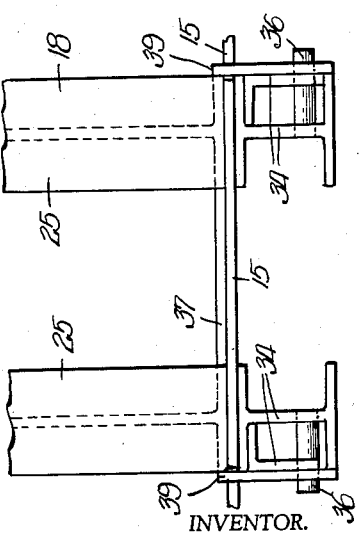
INVENTOR.
Austin G. Talbert,
BY
Cromwell, Greist & Warden
Attys.

United States Patent Office 3,041,087
Patented June 26, 1962

3,041,087
REMOVABLE GOOSENECK DRAWBAR FOR TRAILERS AND THE LIKE
Austin G. Talbert, Lyons, Ill., assignor to Talbert Construction Equipment Company, Lyons, Ill., a corporation of Illinois
Filed Feb. 12, 1959, Ser. No. 792,849
4 Claims. (Cl. 280—425)

This invention relates, generally to improvements in a gooseneck form of drawbar or hitch for detachably interconnecting the front end of a low-bed, heavy duty trailer having rear support wheels only with a tractor unit.

Gooseneck-type drawbars for interconnecting a trailer and tractor have been previously developed and several are illustrated in my Patents, Nos. 2,489,112, dated November 22, 1949, 2,613,945, dated October 14, 1952, and 2,667,-363, dated January 26, 1954. Low-bed trailers are widely used for transporting heavy machinery, such as power shovels, bulldozers, etc., and it is desirable to be able to lower the forward end of such trailers as close to the ground as possible before disconnecting them from a tractor inasmuch as such machinery is normally loaded and unloaded at the forward end of such trailers. Accordingly, when a trailer is connected to a tractor by a gooseneck drawbar it is preferable that the gooseneck be constructed so that its rear end may be tilted from its normal transporting position to a lowered position as close to the ground level as possible before disconnecting the drawbar and the trailer so as to facilitate loading and unloading machinery onto and off of the trailer. However, previous efforts to design such a gooseneck structure have not been entirely successful and, therefore, it is the general object of the present invention to provide a gooseneck structure having a different type connection with the forward end of a low-bed trailer and an improved structural arrangement for anchoring the forward end of the gooseneck at various points on the rear portion of the tractor whereby to permit lowering the rear end of the gooseneck as close as possible to the ground level.

A more specific object of the present invention is the provision of a combination vehicle comprising a tractor, a low-bed, heavy duty trailer having rear support wheels only and a gooseneck drawbar wherein the gooseneck is provided with a specially designed connection to the forward end of the trailer and an improved structural arrangement for anchoring the forward end thereof to the tractor and for tilting the rear end thereof about its anchored forward end.

Another important object of the invention is to provide a tractor-gooseneck-trailer combination of the character described wherein the fulcrum at the forward end of the drawbar, about which the rear end of the drawbar is tiltable, is selectively shiftable along a ramp on the tractor which is inclined downwardly and rearwardly from the fifth wheel thereof.

For a more complete understanding of the nature and scope of the invention reference may now be had to the following detailed description thereof taken in connection with the accompanying drawings, wherein:

FIG. 1 is a side elevational view, partly broken away, showing a low-bed, heavy-duty type trailer unit having rear support wheels only connected to the rear end of a tractor by a removable gooseneck drawbar incorporating the principal features of the invention, the equipment being shown in condition for cross-country transport;

FIG. 2 is a top plan view of the equipment shown in FIG. 1;

FIG. 3 is an enlarged, fragmentary side elevational view showing the connection between the rear end of the gooseneck drawbar and the forward end of the low-bed trailer;

FIG. 4 is a fragmentary front elevational view of the connection between the rear end of the gooseneck drawbar and the forward end of the trailer, the view being taken generally on the line 4—4 of FIG. 3;

FIG. 5 is an enlarged, plan view of the rear end of the tractor and of the forward end of the gooseneck drawbar showing the same disconnected but arranged in end-to-end relationship;

FIG. 6 is an enlarged forward end elevational view of the gooseneck drawbar taken generally on the line 6—6 of FIG. 5;

FIG. 7 is an enlarged vertical section taken generally on the line 7—7 of FIG. 5;

FIG. 8 is a side elevational view of the rear end of the tractor unit and its associated gooseneck drawbar with the forward end of the drawbar anchored at an intermediate point along the ramp of the tractor unit to permit vertical tilting of the rear end of the drawbar, as when connecting and disconnecting it to and from the forward end of the low-bed trailer; and FIG. 9 is a vertical section taken generally on the line 9—9 of FIG. 8.

Referring to FIGS. 1 and 2, reference numeral 12 designates, generally, a low-bed, heavy-duty type trailer having rear support wheels only which is shown interconnected for cross-country transport with a tractor, designated at 13, by means of a gooseneck type drawbar designated generally at 14. The trailer 12 has a low slung bed or carrying platform 15 supported at its rear end on bogie wheels 16—16 by a rear frame structure 17. The trailer 12 is typical of several semitrailer type units in use and available for the purpose of transporting heavy machinery, such as power shovels, bulldozers, etc., cross-country.

The gooseneck 14, as shown in the drawings, is provided with a downwardly projecting or downwardly curved rear portion 18 and a forwardly extending, generally horizontal, portion 19. The bottom end of the downwardly projecting rear portion 18 is adapted to be rigidly interconnected with the front end of the trailer 12 while the forwardly extending portion 19 is arranged to be supported on, and pivotally connected to, a fifth wheel 20 carried on the frame of the tractor 13. The rear end of the tractor 13 is provided with a pair of laterally spaced ramp-forming structural members 22—22 which are inclined or gently curved downwardly and rearwardly from the fifth wheel 20 to the rear end of the tractor 13. The fifth wheel 20 is mounted on a shaft 23 (FIG. 8) which is supported in transversely extending relation on the frame of the tractor 13 so as to permit tilting movement of the fifth wheel 20 between a rearwardly inclined position where it is in alignment with the forward end of the ramp structure 22—22, as shown in FIG. 8, and a horizontal trailer-transporting position, as shown in FIG. 1.

The gooseneck drawbar 14 may be fabricated from any suitable material in any suitable manner. As illustrated in the drawings, it is formed of two gooseneck shaped structural side members 25—25 which are in the form of wide flanged I-beams. The side members 25—25 are suitably interconnected by cross members, such as longitudinally spaced cross braces or bars 26 and 27. A downwardly depending pintle or king pin 29 (FIGS. 5, 6 and 8), having an enlarged head, is provided on the cross brace 26 which is located adjacent the forward end of the gooseneck 14. The pin 29 is adapted to be received in locked relation in the forward end of a slot 31 provided in the fifth wheel 20, as shown in FIG. 5. The slot 31 is provided with outwardly flared sides to facilitate entrance of the neck portion of the pin 29. The pin 29 is adapted to be releasably locked in the end of the slot 31 by a suitable pintle-pin-locking mechanism of a known type. Since the pin-locking mechanism comprises no part of this invention, the details thereof are not disclosed herein.

A suitable pin-locking mechanism is fully disclosed in my Patent No. 2,667,363, issued January 26, 1954. To facilitate movement of the forward end of the gooseneck 14 along the ramp structure 22—22 and engagement of the pin 29 in the end of the slot 31 of the fifth wheel 20, a pair of rollers 33—33 (FIGS. 5, 6 and 8) are preferably provided at the lower forward end of each of the side members 25—25.

A special coupling arrangement for forming a rigid connection between the bottom end of the downwardly curved rear portion 18 of the gooseneck 14 and the forward end of the trailer 12 is provided. The forward end of the trailer 12 is reduced in width (FIG. 2) as compared with the width of the load-carrying portion of the bed 15 so that it is of substantially the same width as the gooseneck 14. A pair of transversely aligned pins or shafts 36—36 extend away from each other in a lateral direction at the forward ends on the opposite sides of the reduced-in-width portion of the trailer 12. As shown in FIG. 4, the pins 36—36 are rigidly supported by laterally spaced, longitudinally extending center beams 34 of the trailer 12, upon which beams the bed 15 of the trailer is supported.

A flat plate 37 is secured on the bottom ends of the downwardly turned rear portions of the two side members 25—25 and extends rearwardly thereof. A side plate 39 is rigidly secured to each outer side or longitudinal edge of the plate 37 so that the two side plates 39 extend downwardly therefrom, as shown in FIGS. 3 and 4. With this construction, the lower end of the downwardly curved rear portion 18 of the gooseneck 14 is adapted to fit over the reduced-in-width forward end of the trailer 12 with the flat bottom plate 37 extending back over and resting on top of the trailer bed 15 and, with the side plates 39—39 extending downwardly along the opposite sides of the reduced-in-width forward end portion of the trailer 12. The leading or forward edge of each of the side plates 39 is provided with a forwardly opening recess 40 (FIG. 3) of a size to receive the pins 36—36 whereby the rear end of the gooseneck 14 is adapted to be hooked from the rear onto the pair of pins 36—36 carried on the forward end of the trailer 12. The connection also includes a pair of pins 42—42 each of which is adapted to be inserted through a pair of aligned bores 38 and 41 formed respectively in the rearwardly extending plate 37 and in the top of the bed 15, as best shown in FIG. 3. Each of the pins 42 is secured to one of the side members 25—25 of the gooseneck 14 by a short length of chain 43 which is attached at one end to the downwardly curved rear portion of a side member 25 and at the other end to the eye-forming head of the pin 42. This arrangement prevents any relative movement between the gooseneck 14 and the trailer 12 and provides a rigid type connection therebetween.

In order to maneuver the tractor connected gooseneck 14 so as to connect and disconnect the rear end of the gooseneck 14 and the forward end of the trailer 12, provision is made for selectively anchoring the forward end 19 of the gooseneck 14 along the length of the tractor-ramp structure 22—22 and for vertically tilting or pivoting the rear end 18 of the gooseneck 14 about its forward anchored end as a fulcrum.

The inner portion of the upper surface of each of the ramp members 22 is provided with laterally spaced rows of longitudinally spaced recesses 45 (FIGS. 5 and 8) which are arranged in laterally aligned paired relation. A pair of lever arms 46—46 are provided at the forward end of the gooseneck 14. Each lever arm 46 is mounted on a stub shaft 44 rigidly secured in the vertical portion of one of the side members 25 adjacent the inner surface thereof in such a manner that each lever arm 46 may be pivoted generally in a vertical plane between the upper and lower inner flanges of the side member 25 at the forward end of the gooseneck 14. The forward end of each of the lever arms 46 is provided with a pair of laterally spaced hook-like fingers 48 which are of a size to be readily engageable within the recesses 45 formed in the ramp members 22—22. The forward end of the inner lower flange of each of the side members 25—25 is removed or cut away, as at 49 in FIGS. 6 and 7, so as to permit the fingers 48 to be pivoted downwardly below the lower surface of the side members 25—25, thus permitting them to be engaged selectively in the ramp recesses 45. The rear ends of the two lever arms 46 are rigidly interconnected by a cross shaft 47 (FIGS. 5 and 6) whereby the two lever arms 46—46 are pivotable together to insure simultaneous anchoring of both sides of the forward end of the gooseneck 14 to the tractor-ramp structure 22—22.

The hook-like fingers 48 are pivoted downwardly to anchor the forward end of the gooseneck 14 along the ramp structure 22—22 of the tractor 13 by means of a frame structure, which is preferably in the form of an A-frame 58 (FIGS. 8 and 9). The A-frame 58 includes a pair of converging side members 59 secured together at their upper ends and having their lower portions pivotably mounted on a cross shaft 61 secured in fixed relation between the vertical web portions of the I-shaped side members 25—25 at a point on the gooseneck 14 intermediate the rear and forward portions 18 and 19. The upper end of the A-frame 58 is provided with a bracket-forming flange 63 having a hook-receiving opening 64 formed therein. The A-frame 58 is normally disposed in a generally horizontal position between the side members 25—25 of the gooseneck 14 with the bracket end of the A-frame 58 disposed to the rear of the shaft 61, as shown in FIG. 1.

A winch 66 of any suitable type is carried on the frame of the tractor 13 forwardly of the fifth wheel 20 and has a cable 67 wound thereabout which is provided with a hook 68 at its end. By engaging the cable hook 68 in the bracket opening 64 of the A-frame 58 and actuating the winch 66 to take up the cable 67, the A-frame structure 58 may be pivoted to a generally vertical position (FIGS. 8 and 9) in which the lower ends of the frame members 59 abut against suitable stop members or pins 70 extending inwardly of the vertical web portions of the members 25—25. With the A-frame 58 in its vertical position and the cable 67 taut, any taking in or letting out of the cable 67 will tiltably or pivotably raise or lower, respectively, the rear portion 18 of the gooseneck 14 about the forward end 19 of the gooseneck when such forward end is anchored at a point along the ramp structure 22—22. The cross shaft 47 which is associated with the pivotable lever arms 46—46 is connected intermediate its ends to the cable 67 by an arrangement which includes a relatively stiff coil spring member 73 (FIGS. 5, 6 and 8). With this arrangement, when the slack is taken up in the cable 67 while it is in hooked engagement with the A-frame 58, the cross shaft 47 is pulled upwardly whereby to automatically pivot the forward ends of the lever arms 46—46 downwardly so that the fingers 48 engage in the recesses 45 formed in the ramp structure 22—22, as in FIG. 8. The relative stiff spring 73 acts as a safety feature by preventing undue stressing of the fingers 48.

In the operation of this equipment, let us assume that the trailer 12 is loaded with a piece of heavy machinery which has been delivered cross-country to the desired place for unloading. The equipment will thus appear as shown in FIG. 1 with the front end of the trailer 12 rigidly connected to the lower end of the downwardly curved rear portion 18 of the gooseneck 14 and with the forward portion 19 of the gooseneck 14 connected to the fifth wheel 20 of the tractor 13. This cross-country transport relationship between the tractor 13, gooseneck 14 and trailer 12 allows for a tilting or hinge action between the tractor 13 and the trailer 12 and also allows the tractor 13 to pivot or turn with respect to the trailer 12. Before proceeding with the unhooking of the gooseneck 14 from the trailer 12, suitable blocking may be positioned beneath the forward end of the trailer 12, if desirable. The rear support wheels 16—16 of the trailer 12 should be blocked also to prevent forward and rearward movement after which the pintle-pin-latching mechanism securing the forward end of the gooseneck 14 to the fifth wheel 20 is released. The tractor 13 is then slowly moved away from the trailer 12 so that the forward end of the gooseneck 14, aided by the rollers 33, moves downwardly along the ramp structure 22—22. This relative movement of the forward end of the gooseneck 14 along the ramp structure 22—22 acts to lower the gooseneck 14 and with it the forward end of the trailer 12 which pivots downwardly about the rear support wheels 16—16. The tractor 13 is slowly moved away until the forward end of the trailer 12 rests either directly on the ground or on blocks positioned under the forward end of the trailer 12. The locking pins 42 inserted between the rear end of the gooseneck 14 and the trailer 12 are now removed and the cable 67 is hooked to the A-frame structure 58 with the relatively stiff coil spring 73 being interconnected between the cross shaft 47 of the pivotable lever arms 46 and the cable 67. The winch 66 is operated to take up the cable 67 and thus to pivot the A-frame structure 58 into its vertical position. As the slack is taken up in the cable 67, the pivotable lever arms 46 have their forward ends pivoted downwardly, as fully described herein, through the action of the spring 73 and the cross shaft 47 whereby the hook-like fingers 48 of the lever arms 46 are engaged in the recesses 45 of the ramp 22—22, thus providing an anchored fulcrum at the forward end of the gooseneck 14 about which the downwardly curved rear portion 18 of the gooseneck 14 may be vertically tilted or pivoted upon actuating the winch to either take up or let out additional cable. The tractor 13 is then backed up sufficiently to disengage the recessed side plates 39—39 from the pins 36—36 after which the winch 66 is actuated to take up the cable 67 and to raise the rear portion 18 of the gooseneck 14 about its forward end as a fulcrum sufficiently to permit the tractor 13 and the gooseneck attached thereto to be driven away from the trailer 12 so that the trailer may be unloaded in a suitable manner from its forward end.

In recoupling or reconnecting the gooseneck 14 to the forward end of the trailer 12, it is merely necessary for the driver to back the tractor 13 until the rear end 18 of the gooseneck 14 is disposed slightly to the rear of the pins 36—36 carried on the front of the trailer 12 whereupon the rear end of the gooseneck 14 is tilted downwardly by letting out some of the cable 67 until the side plate recesses 40—40 are in approximate alignment with the pins 36—36. The tractor 13 is then advanced sufficiently to engage the recessed side plates 39—39 with the pins 36—36 of the trailer 12. The locking pins 42 are then inserted between the rear end 18 of the gooseneck 14 and the trailer 12 and the cable 67 is slackened to permit the A-frame structure 58 to drop back into its normal horizontal position and to permit the fingers 48 of the pivotable lever arms 46 to swing upwardly out of engagement with the ramp recesses 45. The cable 67 may then be unhooked from the A-frame structure 58 after which the tractor 13 is backed up toward the trailer 12 whereupon the forward end of the gooseneck 14 rides upwardly along the ramp structure 22—22, raising the gooseneck 14 and the forward end of the trailer 12. The tractor 13 is backed up until the pintle pin 29 is disposed in the forward end of the slot 31 of the fifth wheel 20 whereupon the pintle-pin-locking mechanism is actuated to secure the forward end of the gooseneck in locked relation on the fifth wheel of the tractor 13. The tractor 13 and the trailer 12 are now properly connected through the gooseneck 14 for cross-country transport.

It will be understood that certain changes may be made in the structural arrangement of the combination vehicle disclosed herein without departing from the spirit and scope of the invention as defined in the appended claims.

I claim:

1. In combination with a tractor having a fifth wheel adapted to support and releasably engage the forward end of a gooseneck drawbar, a pair of laterally spaced ramp members inclined downwardly from the fifth wheel to the rear end of the tractor, and a winch disposed forwardly of the fifth wheel and having a cable associated therewith, and a gooseneck drawbar having a forwardly extending portion adapted to be connected to the fifth wheel of the tractor and a downwardly curved rear portion adapted to be connected to the forward end of a low-bed semitrailer, means for pivotably raising and lowering the downwardly curved rear portion of the drawbar about its forward end as a fulcrum comprising, an elongated frame structure pivotably mounted intermediate the ends thereof adjacent the rear portion of said drawbar, a stop member rigidly mounted on said drawbar directly below the pivotable mounting of said elongated frame structure, said elongated frame structure being disposed in a horizontal position during transport and being pivotable to an upright position with its then lower end disposed against said stop member and its then upper end adapted to be connected to the end of said cable, means defining a plurality of longitudinally spaced apertures on the upper surface of each one of said pair of ramp members, the apertures on the two ramp members being laterally aligned with each other, a plurality of laterally spaced and aligned lever arms pivotably mounted on the forward portion of the drawbar, said lever arms being disposed horizontally above the bottom surface of the drawbar during transport, and means for resiliently interconnecting said lever arms with said cable when it is connected to said upper end of said elongated frame structure whereby when the forward end of said drawbar is disengaged from the fifth wheel and moved relative to said ramp members and the slack is taken up in said cable said lever arms are pivoted downwardly into anchoring engagement with a laterally aligned series of said apertures to provide a fulcrum for pivotably raising and lowering the downwardly curved rear portion of the drawbar about its anchored forward end upon forward or rearward movement, respectively, of said tightened cable under the control of said winch.

2. Interconnected vehicles including a tractor and a low-bed semitrailer, said tractor including a rear platform having a fifth wheel mounted thereon, an upwardly inclined ramp structure on said platform extending forwardly from the rear end thereof toward said fifth wheel and having a plurality of longitudinally spaced and laterally aligned apertures formed on the upper surface thereof, and a winch mounted forwardly of said fifth wheel and having a cable associated therewith, said trailer including a wheel-supported rear end and a removable gooseneck drawbar at the front end having a forwardly extending portion in pivotal and supported connection with said fifth wheel, said draw bar having a downwardly curved rear portion removably attached at the bottom thereof to the forward end of said trailer, an elongated member pivotably mounted intermediate the ends thereof on said drawbar adjacent said downwardly curved rear portion and adapted to be pivoted between two positions, said member in one position being disposed horizontally and in the other position being disposed vertically in which latter position one end of said cable is adapted to be connected to the upper end of said member, a plurality of laterally spaced and aligned lever arms pivotably mounted on the forward portion of said drawbar, said lever arms being adapted to extend horizontally above the bottom surface of said drawbar in one position and being adapted to be selectively pivoted downwardly into anchoring engagement with said laterally aligned apertures on said ramp structure, and means resiliently connecting said lever arms to said cable at a point spaced from said one end when said cable is connected to said elongated member whereby when the slack is taken up in said cable said lever arms are pivoted into anchoring engagement with said ramp structure to provide a fulcrum at the forward end of said drawbar for pivotably raising and lowering the rear end thereof upon forward and rearward movement, respectively, of said cable.

3. In combination with a tractor having a fifth wheel adapted to support the forward end of a gooseneck drawbar, a pair of laterally spaced ramp members inclined downwardly from the fifth wheel to the rear end of the tractor, and a winch disposed forwardly of the fifth wheel and having a cable associated therewith, a low-bed semitrailer having a wheel-supported rear end, and a gooseneck drawbar having a forwardly extending portion adapted to be releasably connected to the fifth wheel of the tractor and a downwardly curved rear portion adapted to be connected to the forward end of the trailer, interconnecting means between the downwardly curved rear portion of the drawbar and the forward end of the trailer comprising, a pair of side plates depending from the downwardly curved rear portion of the drawbar and adapted to extend along opposite sides of the forward end of the trailer, means defining a generally semicircular recess in the forward edge of each one of said pair of side plates, and a pair of horizontal pins extending in opposite lateral directions from the sides of the trailer at the forward end thereof, said recessed side plates being adapted to be hooked onto said pins from the rear thereof to interconnect the rear portion of the drawbar and the forward end of the trailer, and means for anchoring the forward end of the drawbar relative to the ramp members to permit pivotal raising and lowering of the rear portion of the drawbar about its forward end to interconnect the drawbar and the trailer comprising, an elongated frame structure pivotably mounted intermediate the ends thereof on and adjacent to the rear portion of said drawbar, a stop member rigidly mounted on said drawbar directly below the pivotal mounting of said frame structure, said frame structure adapted to be disposed in a horizontal position and in an upright position in which position its lower end is disposed against said stop member and its upper end is adapted to be connected to one end of said cable, means defining a plurality of longitudinally spaced apertures on the upper surface of each one of said pair of ramp members, the apertures on the two ramp members being laterally aligned with each other, a plurality of lever arms pivotably mounted on the forward portion of the drawbar in lateral alignment and above the bottom surface of the drawbar, and means resiliently interconnecting said lever arms with said cable at a point spaced from said one end thereof when it is connected to said upper end of said frame structure whereby when the forward end of said drawbar is disconnected from the fifth wheel and moved relative to said ramp members and the slack is simultaneously taken up in said cable said lever arms are pivoted downwardly from a horizontal position into engagement with a laterally aligned series of said apertures to provide an anchored fulcrum for pivotably raising and lowering the downwardly curved rear portion of the drawbar about its forward end upon forward or rearward movement, respectively, of said tightened cable to hook said recessed side plates onto said pins carried on the forward end of said trailer.

4. Interconnected vehicles including a tractor and a low-bed semi-trailer, said tractor including a rear platform having a fifth wheel mounted thereon, an inclined ramp extending downwardly and rearwardly from said fifth wheel, and a plurality of pairs of laterally aligned recesses spaced longitudinally along said inclined ramp, said trailer including a wheel-supported rear end portion and a removable gooseneck drawbar front end portion in releasable engagement with said fifth wheel, said drawbar having a downwardly curved rear portion removably attached at the bottom thereof to the forward end of said trailer, a pair of laterally spaced levers pivotably mounted on the forward end of said drawbar and adapted to be pivoted from out-of-the-way positions into anchored engagement in any one of said pairs of laterally aligned recesses in said inclined ramp for selectively anchoring the forward end of said drawbar at different locations along said ramp when said drawbar is disengaged from said fifth wheel, and coacting means on said tractor and said drawbar operable to pivot said levers into anchored engagement in any one of said pairs of ramp recesses.

References Cited in the file of this patent

UNITED STATES PATENTS

| | | |
|---|---|---|
| 2,325,869 | Mosling | Aug. 3, 1943 |
| 2,489,112 | Talbert | Nov. 22, 1949 |
| 2,667,363 | Talbert | Jan. 26, 1954 |
| 2,722,433 | Shinn et al. | Nov. 1, 1955 |
| 2,894,764 | Ronk | July 14, 1959 |
| 2,963,302 | Ronk | Dec. 6, 1960 |